March 30, 1943.    R. E. BRIGGS    2,314,969
ADJUSTABLE SPROCKET WHEEL
Filed March 12, 1941    2 Sheets-Sheet 2
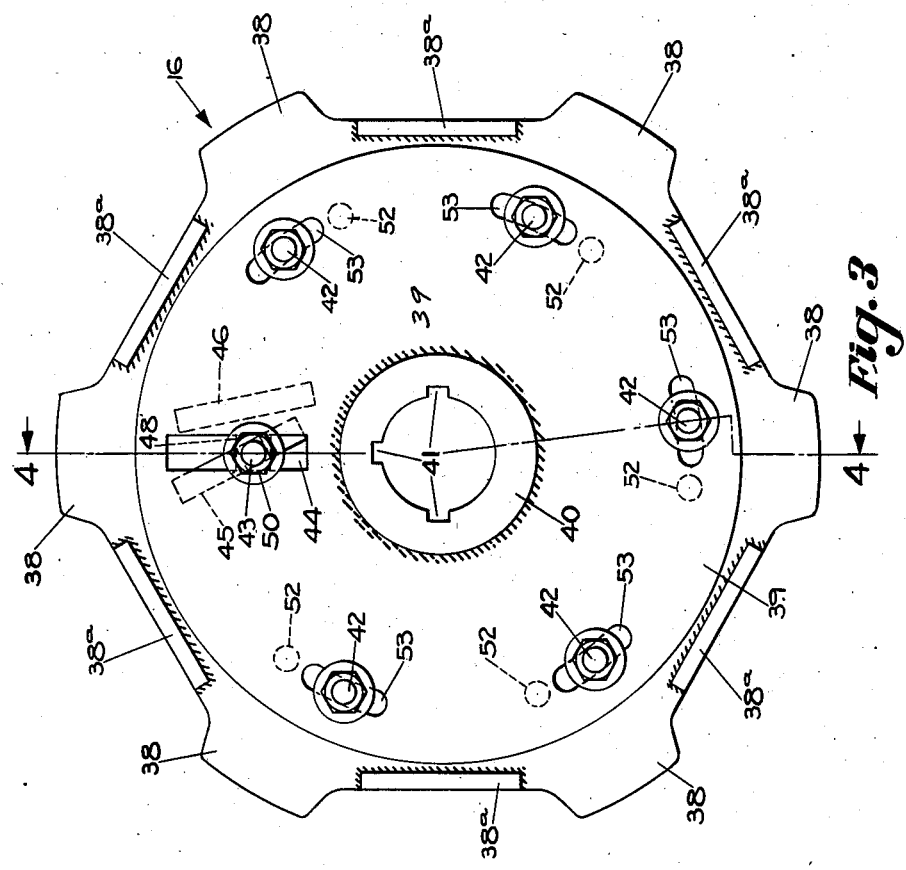
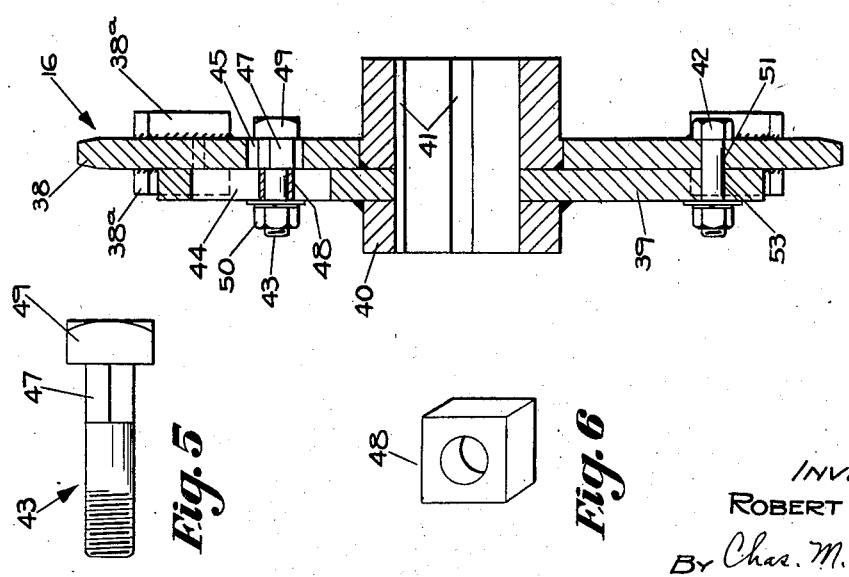
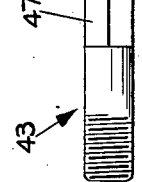
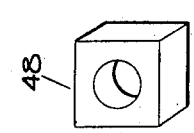
INVENTOR:
ROBERT E. BRIGGS,
By Chas. M. Nissen,
ATT'Y.

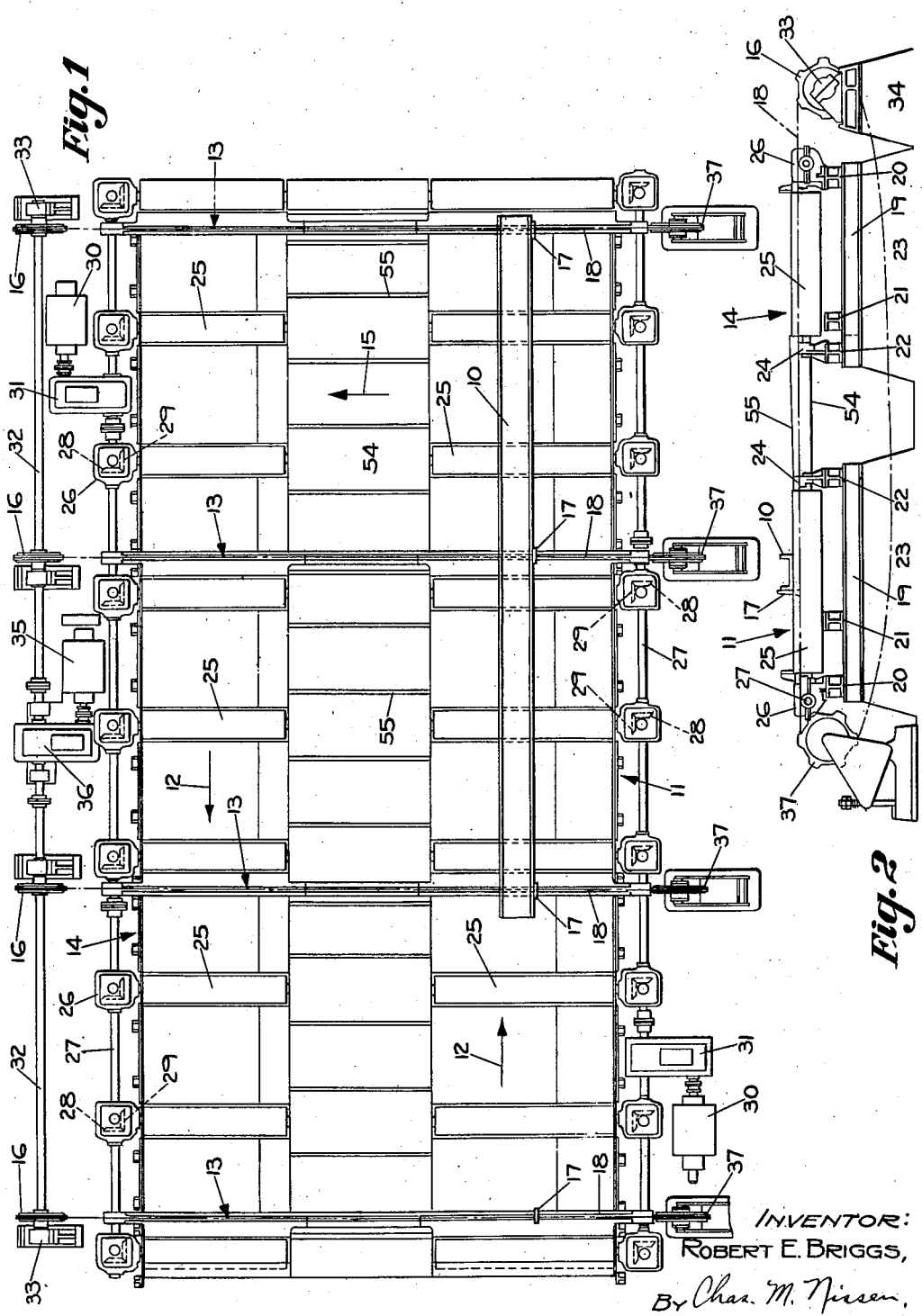

Patented Mar. 30, 1943

2,314,969

UNITED STATES PATENT OFFICE 2,314,969

ADJUSTABLE SPROCKET WHEEL

Robert E. Briggs, Columbus, Ohio, assignor to The Jeffrey Manufacturing Company, a corporation of Ohio Application March 12, 1941, Serial No. 382,968

6 Claims. (Cl. 74—243)

My invention relates to conveyor apparatus and one of its objects is the provision of improved and efficient mechanism for mounting a rotary power transmission device for adjustment relative to a driving shaft to secure a predetermined relation between such shaft and conveyor mechanism driven by such rotary power transmission device.

Another object of the invention is the provision of improved mechanism for relative adjustment between spaced conveyor elements to secure their operation in predetermined relation to each other.

A further object of the invention is the provision of improved mechanism for relative adjustment of endless traveling conveyor elements to enable them to be driven from one shaft and operate simultaneously in predetermined relation to each other.

A still further object of the invention is the provision in rolling mill conveyor apparatus of improved mechanism for adjusting the sprockets of a plurality of spaced-apart chain flight conveyors to enable the latter to be driven from one shaft while the flights on the conveyors are arranged in lateral alinement for simultaneous engagement of the rolled metal channels or bars to transfer the latter from one live roller conveyor to another in the operation of the rolling mill.

More particularly it is the object of the present invention to provide mechanism for mounting a sprocket for rotary adjustment on a disc keyed to a driving shaft so that a conveyor flight on an endless draft chain meshing with the sprocket may have its position adjusted relative to a flight on another endless draft chain connected to the same shaft for the purpose of being driven thereby.

A further object of the invention is to provide an improved and simplified adjustable sprocket wheel.

Other objects of the invention will appear hereinafter, the novel features and combinations being set forth in the claims hereto appended.

Referring to the accompanying drawings:

Fig. 1 is a plan view of a live roll conveyor mechanism and an associated transfer device comprising my invention;

Fig. 2 is an end elevation of the devices shown in Fig. 1;

Fig. 3 is a view of a drive sprocket or transmission device incorporating the features of my invention;

Fig. 4 is a sectional view of the drive sprocket taken on the line 4—4, looking in the direction of the arrows;

Fig. 5 is an enlarged view of a special bolt for adjusting the sprocket relative to the driving member; and Fig. 6 shows a collar used with the bolt of Fig. 5.

Referring to Figs. 1 and 2 of the drawings there is illustrated conveyor apparatus including means for transferring material, such as a rolled channel 10, from a live roll conveyor 11 and operating to move the channel 10 in the direction of the arrow 12 by means of a transfer device 13 onto another live roll conveyor 14 which is operated to move the material in the direction of the arrow 12'. The transfer device 13 includes drive sprockets 16 adjustable about the axis of their drive shaft to aline transversely material engaging elements 17 fixed to endless chains 18.

The live roll conveyors 11 and 14 are generally alike. Each comprises a main supporting frame made up of channel shaped cross members 19 (Fig. 2) connected longitudinally by a plurality of stringers 20, 21 and 22, all of which are supported on concrete or steel footings 23 positioned under each cross member 19. Mounted along the stringer 22 or at the inside edge of the live roll conveyors 11 and 14 (see Fig. 2) is a plurality of spaced bearings 24 in each of which is journaled a shaft of the live rolls 25, the opposite end of each shaft being journaled in a bearing of a gear housing 26, there being a plurality of said housings mounted at spaced intervals along the stringer 20. The housings 26 also are provided with bearings for a longitudinally extending shaft 27 having fixed thereto, inside said housings 26, bevel gears 28 which mesh with bevel gears 29 fixed to the outer ends of the roll shafts. A drive motor 30 is connected to said shaft 27 through a speed reduction unit 31 thereby to drive all of said rolls 25 at the same speed resulting in travel of any material such as the rolled beam 10 therealong in the direction of rotation of the rolls.

In the art of making rolled shapes there is usually employed a stamp or forming device (not shown) placed at the head end of live roll conveyor 11, the conveyor 11 receiving the rolled shape and conveying it to the place of next operation. In many installations, due to building design, it is necessary to transfer the members, such as channel 10, to another live roll conveyor such as the conveyor 14. For this purpose I use the transfer device 13. This comprises the drive sprockets 16 mounted on the shaft 32 which extends alongside the live roll conveyor 14 and which is supported in spaced journal bearings 33 also mounted on concrete or steel supports 34. Rotation of the shaft 32 is by the drive motor 35 through the speed reduction unit 36. Trained about the drive sprockets 16 and cooperating foot sprockets 37 adjacent conveyor 11, are endless draft elements, such as the chains 18, to which are attached the material engaging elements 17 which are adapted to move the shapes 10 transversely of the live roll conveyors 11 and 14 in the direction of the arrow 15.

The channel 10, or other shape, is heated for forming in the stamp and it is likely to be distorted in subsequent handling if care is not taken in applying transverse moving forces. For this reason it is necessary that all of the material engaging elements 17 be in exact alinement when they engage the channel 10 to move it from live roll conveyor 11 to live roll conveyor 14. The wear of the parts and uneven stretch of the draft elements 18 will affect alinement of the material engaging elements 17; therefore I have provided an improved adjustable drive sprocket to maintain proper alinement of engaging elements 17 at all times.

As illustrated in Figs. 3 and 4 of the drawings each of said sprockets 16 comprises a toothed wheel 38 that is clamped to a driving disc 39 provided with a hub 40 having keyways 41 which cooperate with keys to key it to shaft 32.

The toothed sprocket wheel 38 has a flat surface adapted to fit against a flat surface of the disc 39 and is clamped thereto by means of clamping bolts 42. Alinement of the material engaging elements 17 of the endless draft elements 18 may be accomplished by relative rotary movement of the sprocket wheel 38 and the disc 39. For this purpose I use a bolt 43 adapted to be extended through a radially extending slot 44 in the disc 39 and one of two slots 45 or 46 of the sprocket wheel 38. Referring to Fig. 3, it will be noted that slot 45 is placed at a slight angle to a radial line and that slot 46 is at a slightly greater angle.

The bolt 43 has a squared shank as indicated at 47 adapted to fit the slot 45 or 46 of the sprocket 38 and thereby held against rotation. A collar 48 is shaped to fit the slot 44 of the disc 39 and is bored to fit the bolt 43. When the parts are in assembled relation as shown in Fig. 3 radial movement of the bolt 43 along slot 44 will cause relative rotary movement of the sprocket wheel 38 and the disc 39 thereby to effect a very accurate and easy continuous adjustment of the sprocket wheel 38 relative to the disc 39 and shaft 32. The adjusting bolt 43 is provided with a head 49 and a nut 50 so that it may also be used for clamping purposes. The clamping bolts 42 extend through apertures 51 of the sprocket wheel 38 when the adjusting bolt 43 is in slot 45 and apertures 52 when said bolt 43 is in slot 46. Circumferentially elongated slots 53 in the disc 39 permit relative movement of the sprocket wheel 38 and the disc 39.

Flanges 38ª extending laterally of both sides the sprocket wheel 38 support the articulation points of the endless chain 18 and increase the bearing area thereby minimizing wear.

In operation of the live roll conveyors and transfer device the channel 10 is carried from the stamp or forming machine along the live roll conveyor 11 to a position therealong where it is desired to move it to the conveyor 14. The conveyor 11 is stopped and then the transfer device 13 is started and when the material engaging elements contact the channel 10 it will be moved laterally of the rolls and onto the supporting platform 54 which has the vertically extending flanges 55 over which the channel 10 is moved until it reaches the live roll conveyor 14. It will be noted by reference to Fig. 2 that the flanges 55 are positioned below the surface of the live roll conveyor 11 and above the surface of the live roll conveyor 14. After the transfer device 13 has moved the channel 10 to proper position on the conveyor 14, the transfer device is stopped and the live roll conveyor 14 started to move the channel 10 in the direction of the arrow 12'.

As above explained, if any of the material engaging elements 17 are out of alinement with the others the sprocket wheel 38 of that drive is rotated relative to the driving disc 39 to bring it into alinement, thus insuring that no distortion of the channel 10 or other shape will be caused by said lateral transferring.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. The combination with two rotary members, of a sprocket on one of said members, means adapting the other member to be connected to a shaft to rotate therewith, means comprising elongated slots angularly related and overlapping with clamping mechanism extending therethrough, and additional clamping mechanism between said members for securing the same together in relative adjusted positions in co-operation with said first-named clamping mechanism.

2. The combination with two rotary members adapted for rotary adjustment relative to each other, of a sprocket on one of said members, bolts extending through holes in one of said members and slots in the other member, and a bolt extending through elongated overlapping slots in said members, one of said members having an additional elongated slot and a series of circumferentially spaced holes for receiving the bolts for an additional series of adjustments between said members.

3. The combination with a shaft, of two rotary members one keyed to said shaft to rotate therewith, a radial slot in one of said members, two adjacent diagonal slots in the other member either of which is adapted to overlap the said radial slot, and clamping mechanism extending through said radial slot and either of said diagonal slots to hold the members in relative adjusted positions.

4. The combination with two rotary members relatively angularly adjustable, of a radial slot in one of said members, spaced-apart diagonal slots in the other member, said diagonal slots being in intersecting planes each spaced from the axis of rotation of said members, and clamping mechanism extending through said radial slot and either of said diagonal slots to secure the holding of said members in relatively adjusted positions through a wide pitch angle determined by the position of the outer end of one of said diagonal slots and the inner end of the other slot.

5. The combination with a disc adapted to be keyed to a shaft, of a sprocket journaled on said shaft, a radial slot in the disc, diagonal slots in the sprocket with the inner end of one diagonal slot in radial alinement with the outer end of the other diagonal slot, and bolt clamping mechanism extending through said radial slot and either of said diagonal slots, the angular adjustment of the sprocket relative to the disc extending over a predetermined pitch angle.

6. The combination with a rotary support adapted to be keyed to a shaft, of a sprocket associated with said rotary support, and clamping mechanism slidable radially along slots in said disc and in said rotary support to hold the sprocket in angularly adjusted position relative to said rotary support, such adjustment extending over a pitch angle equal approximately to the pitch angle of one sprocket tooth.

ROBERT E. BRIGGS.